Jan. 4, 1955  J. O. KNUDSEN  2,698,611
VALVE MECHANISM FOR INTERNAL-COMBUSTION ENGINES
Filed July 13, 1951  2 Sheets-Sheet 1
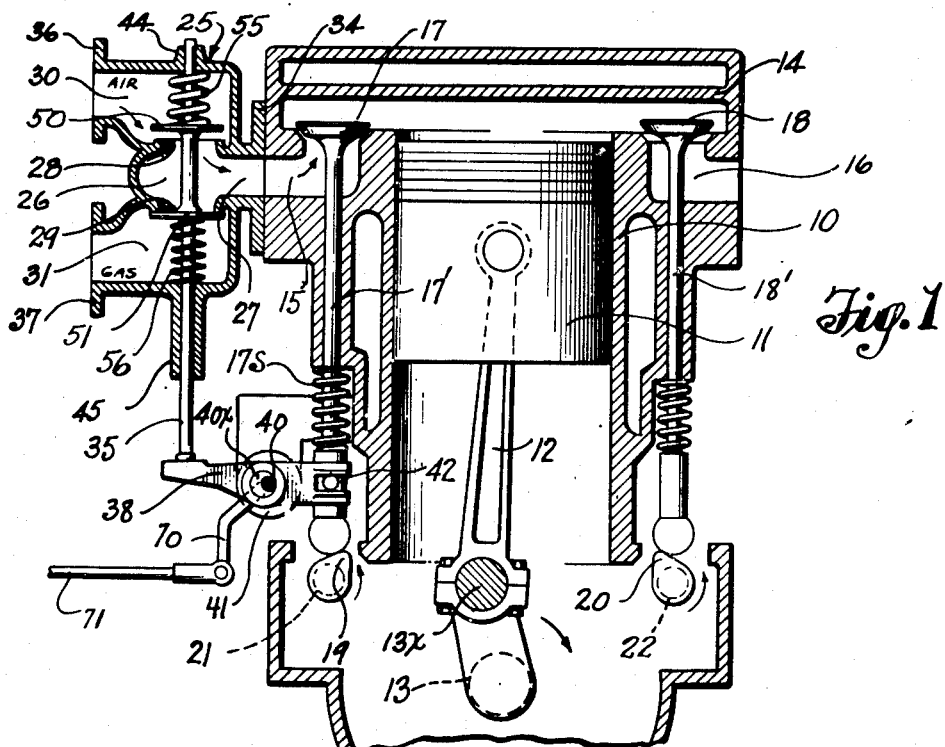
Fig.1
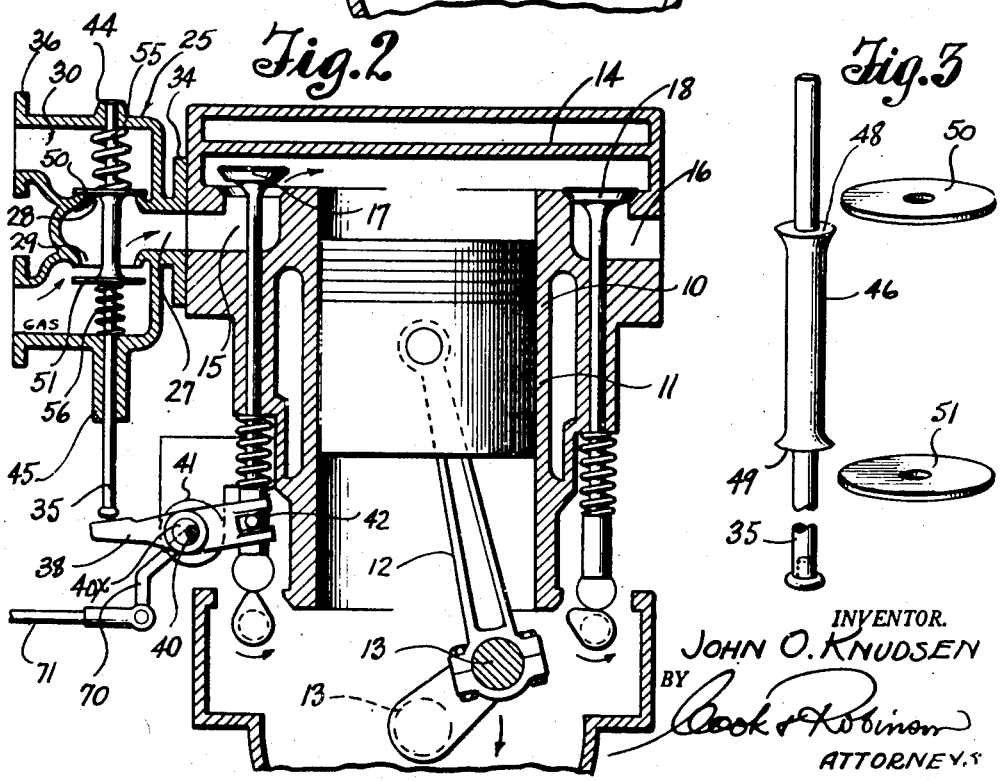
Fig.2
Fig.3
INVENTOR.
JOHN O. KNUDSEN
BY
Cook & Robinson
ATTORNEYS

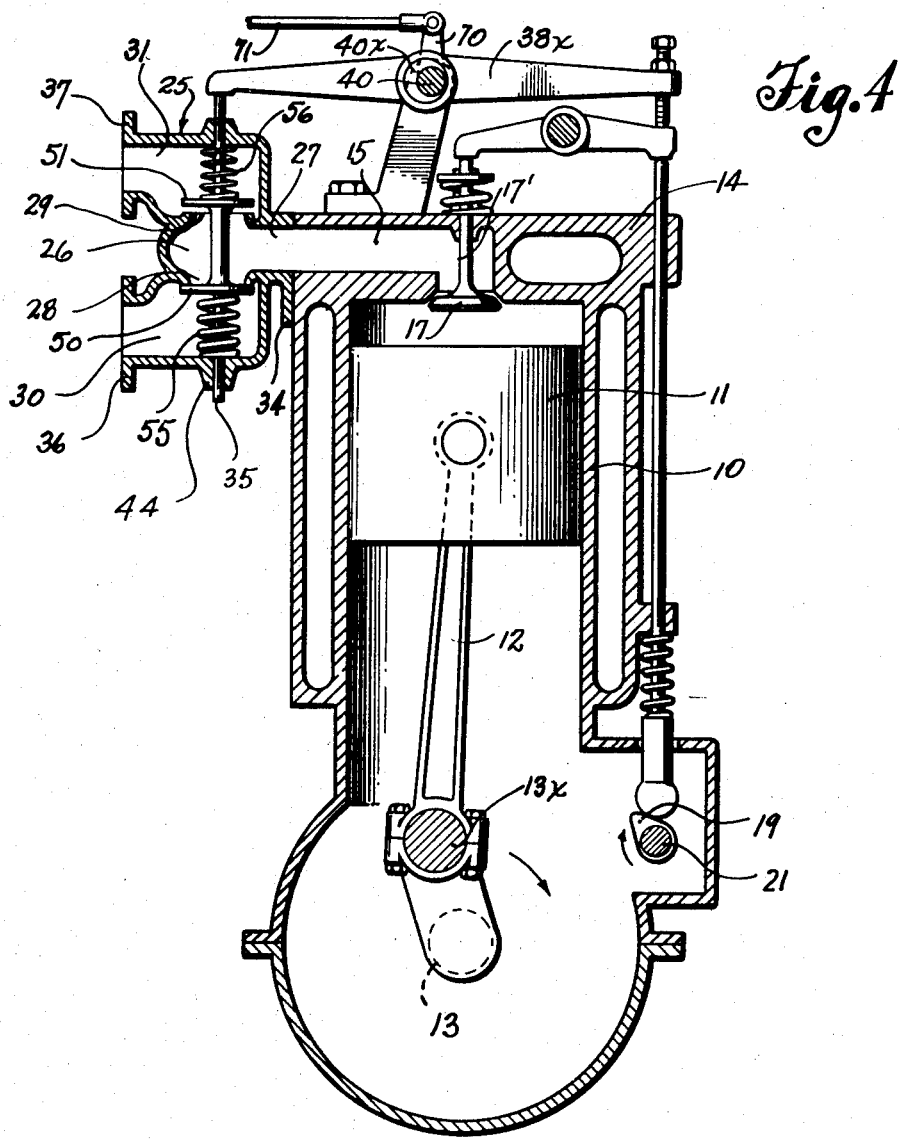

United States Patent Office 2,698,611
Patented Jan. 4, 1955

2,698,611

VALVE MECHANISM FOR INTERNAL-COMBUSTION ENGINES

John O. Knudsen, Seattle, Wash.

Application July 13, 1951, Serial No. 236,618

4 Claims. (Cl. 123—76)

This invention relates to improvements in internal combustion engines of those kinds typified by present day automobile engines that operate on the four stroke cycle principle. More particularly, the invention pertains to valve mechanisms, designed to be interposed and used in the fuel delivery passages between the carburetor and fuel intake openings leading into the combustion chambers of the cylinders of the engine, as means for the positive timing of the admittance of fresh air to the cylinders to overcome a certain fuel waste that results from present day modes of operation, and to bring about other advantages in operation of the engine.

For a better understanding of the present invention, it will here be explained that in the operation of the common or ordinarily used types of automobile engines, using the four stroke cycle principle and employing gasolene as the fuel, there is a certain time interval during each cycle of operation and pertaining to each cylinder of the engine, that both the fuel intake valve and exhaust valve for the cylinder are open. Because of this particular condition in the timing of the valves, an appreciable waste of gasolene, or fuel results therefrom; the fuel charge, in part, being sucked through the explosion chamber into the exhaust manifold before the exhaust valve closes. Raw or unburned gas is thus not only wasted, but being a poisonous and harmful gas, causes a dangerous situation to be established about the engine.

In view of the above undesirable results that are due to what otherwise is an advantageous timing of the engine intake and exhaust valves, and to the use of some of the carbureted air charge to sweep or scavenge the burned gases from the engine cylinders prior to their reception of fresh charges, it has been the primary object of this invention to provide a practical, easy to apply and easily operable valve mechanism, for interposition between the carburetor and intake valve of the engine cylinder, or cylinders which it accommodates, and adapted to be so timed in its sequence of operations with respect to the strokes of the piston of the cylinder and with the actions of its intake and exhaust valves, that fresh air charges will be admitted to the cylinders during those periods when both intake and exhaust valves are open and the admittance of carbureted air at that time will be avoided.

Further objects of the invention reside in the details of construction of the present valve mechanism; in its combination with the engine cylinder and its intake and exhaust valves as already provided, and in the relationship and mode of operation of its valves to time the admittance of fresh air, and the fuel charges to the explosion chamber of the cylinder, to bring about advantages in operation, and a saving in fuel.

In accomplishing these and other objects of the invention, I have provided the improved details of construction, the preferred forms of which are illustrated in the accompanying drawings, wherein—

Fig. 1 is a vertical cross-section through the power cylinder of an engine that is equipped with a valve mechanism embodied by the present invention; showing the position of its valve elements for closing off fuel mixture admittance and allowing admittance of fresh air during that period when the intake and exhaust valves of the engine cylinder are both open.

Fig. 2 is a similar view, but showing the valve elements of the present mechanism in positions to close off admittance of fresh air and to admit fuel mixture to the cylinder during the suction sroke of the piston.

Fig. 3 is a perspective view of parts of the present valve mechanism in disassembled relationship for explanatory purposes.

Fig. 4 is a cross-sectional view of a valve-in-head engine, as equipped with a valve mechanism of the present invention.

Referring more in detail to the drawings—

10 designates one of the power cylinders of a present day type of engine designed to operate on the four stroke cycle principle. Reciprocally contained in the cylinder is a piston 11, connected by a rod 12 with a throw or arm 13x of the crank shaft 13. The cylinder head, 14, is equipped with a fuel intake passage 15 and an exhaust passage 16. The usual poppet valves, 17 and 18, are arranged to control these passages and they are actuated between open and closed positions by their stems 17' and 18', and actuating cams 19 and 20 fixed on cam shafts 21 and 22; these cam shafts being operatively connected with the crank shaft 13 to rotate at one-half its speed in accordance with the usual method of valve operation, thus to accomplish the proper sequence of valve operations with respect to the piston strokes; the means for and method of operation being so well known that further explanation is not believed necessary.

Mounted on the cylinder block is the valve mechanism embodied by the present invention. This comprises a housing 25, which encloses valves that are timed in their opening and closing movement with the action of valves 17 and 18. The housing 25 comprises a centrally located chamber 26 with an outlet 27 opening directly into the fuel intake passage 15 that is controlled by the intake valve 17. At its top and lower sides, respectively, the chamber 26 has valve controlled inlets 28 and 29, through which direct connections are provided, respectively, with a fresh air chamber 30 and a fuel mixture chamber 31. The chamber 30 can be connected with, or is open to any source of fresh air. Chamber 31 would ordinarily be in direct connection with the fuel delivery manifold that is supplied with a carbureted mixture by the carburetor, the carburetor and its manifold not being shown herein.

As herein shown, the housing 25 is flanged as at 34 for securement to the engine block, and also has flanges 36 and 37 about the inlets to chambers 30 and 31 for the attachment of the air and fuel supply manifolds thereto.

Extended vertically through the housing 25, and passing centrally through the openings 28 and 29 of chamber 26, is a reciprocally movable valve rod 35. This is adapted to be actuated in timing with the action of the valve 17 by a rocker lever 38. The lever 38 is pivotally supported between its ends by a pivot shaft 40 that is rotatably mounted in a bearing 41 which is attached to the engine block or crank case. At its inner end the lever has a pin and slot connection, as at 42, with the lower end portion of valve stem 17'. The outer end of the lever 38 underlies the lower end of valve rod 35 and is adapted to engage therewith for its upward actuation. As the cam 19 revolves, it operates in the usual way to raise the intake valve 17 to an open position to control its closing action under the influence of the valve spring 17s.

The rocker lever 38 operates in a predetermined timing with the action of valve 17, to lift the valve rod 35, the upper and lower end portions of which are slidably contained in bearings 44 and 45 in walls of the housing 25. Intermediate its ends, the stem has an integral or fixed enlargement 46, best shown in Fig. 3, that provides, at its upper and lower ends respectively, the upwardly and downwardly facing shoulders 48 and 49, best shown in Fig. 3. Applied to the opposite end portions of the rod, for movement therealong, are valves 50 and 51 of disk form. Disk 50 overlies passage 28 to close downwardly thereover and disk 49 likewise is adapted to close over passage 29 from its under side. A coiled spring 55 surrounds the rod 35 between the valve 50 and top wall of chamber 30 and bears against the valve to urge it toward its closed position over passage 28. At the same time it operates to push the rod 35 downwardly by reason of the valve disk 50 being seated against the rod shoulder 48. Likewise, a coiled spring 56, which is of lesser strength than spring 55, is located about the rod 35 between valve disk 51 and bottom wall of chamber 31, and bears against these parts to urge the valve disk 51 toward closed position over passage 29.

The spacing of the shoulders 48 and 49 on the valve rod 35 is such that if valve 50 is closed, the valve 51 will be held by the rod in an open position as in Fig. 2. Likewise, if the rod 35 is lifted to a position which allows valve 51 to be closed, then the valve 50 will be held open. The opening and closing of these valves, 50 and 51, however, is controlled by the action of lever 38 and this is actuated through its pin and slot connection with stem 17' of valve 17, and this is controlled by the action of cam 19. Thus the timing of the present valve mechanism is synchronized with the strokes of the piston 11 and action of the engine valves as they already exist.

With the valve device of this invention applied to the engine as shown in Figs. 1 and 2, and with the lever arm 38 arranged to contact the lower end of rod 35 and to lift it to such extent that valve disk 29 will be disposed at an open position during the interval of time in each cycle of operations that valves 17 and 18 are both open, the movement of the valve 17 to a closed position, as permitted by the advancement of cam 19, results in the closing of valve 50 and the opening of valve 51. Thus the action of the piston 11, in consideration of the open position of the valves 17–18, first causes indrawing of fresh air past the open valve 50 to sweep burned gases from the explosion chamber, and then with the closing of exhaust valve 18 and the full opening of intake valve 17, the lever 38 moves downwardly and away from the lower end of rod 35 and the spring 55, which is substantially stronger than spring 56, pushes the valve 50 to closed position and opens valve 51 for the intaking of a fuel charge from the carburetor, through chamber 31, passage 29, chamber 26 and passage 15.

Accuracy and adjustment in the timing of the action of valve rod 35 by the lever 38 is made possible by mounting the lever 38 on a journal bearing box 40x that is eccentric of the shaft 40 as rotatably held in bearing block 41. A lever arm 70 is attached to shaft 40 for effecting its rotation, and a link, as at 71 can be extended from the lever arm to a position convenient to the operator.

In Fig. 4 I have illustrated the application of the valve mechanism of this invention to an engine of valve-in-head type. In this installation all parts of the device are substantially as in Fig. 1 except as required to accommodate this type of engine. In this view, the valve housing and its contained valves are inverted, with respect to the showing in Fig. 1, and the valve rod 35 is actuated by a rocker lever 38x which is actuated in predetermined timing with the piston and intake valve action to accomplish the same results, in a manner similar to that which has been described in connection with the engine of Fig. 1. The adjustment of lever 38x is also made possible by mounting means corresponding to that of Fig. 1 and designated by like reference numerals.

In the mechanism of the present invention, the valves 50 and 51 alternately close and open. The opening of the fresh air valve 50 is positively controlled by lever 38. The closing of this valve is effected by the action of spring 55.

One of the important engine operating advantages made possible by the present invention resides in the fact that, if the engine is coasting, for example, as when an automobile is running down a grade and is being retarded by the compression of the engine, the lever positioning eccentric 40x can be rotated by connections 70 and 71, to a position at which the rocker lever 38, or 38x in Fig. 4, will not actuate the intake valve 50 to open position, but will admit full charges of air for each compression stroke of the piston. Thus instead of wasting fuel charges in braking the vehicle, air only is used for this purpose and with better effect, because of the free admittance of full air charges.

It is anticipated that control of the engine might be possible through the mediacy of parts 38, 40x and 71.

Having thus described my invention, what I claim as new therein and desire to secure by Letters Patent, is:

1. In an internal combustion engine having a power cylinder with fuel intake and exhaust passages, valves controlling said passages, a power piston reciprocally operable in the cylinder, means for timing the functional actions of said valves with the piston action for a four stroke cycle operation which includes a definite interval overlapping the end of the exhaust stroke and beginning of the suction stroke when both of said valves are open, and a source of supply of carbureted air for said engine; an auxiliary valve mechanism comprising a housing interposed between the source of supply of carbureted air and cylinder and formed with a chamber having an opening in direct communication with the intake passage of the cylinder, and formed with ports in opposite walls opening to passages adapted for connection respectively with the source of supply of carbureted air and with outside air, a control valve for each of said ports and an actuator for said control valves that is timed with the movements of the intake valve of the engine to close the valve of the fuel port and open the valve of the air port only during that period when both engine valves are open, and to close the air port and open the fuel port during the suction stroke of the piston and in timing with the opening action of the valve of the fuel intake passage; said actuator comprising a rod that is common to both control valves, a rocker lever with pivotal mounting, operatively connected with the timing means for the inlet valve for its actuation in accordance with the inlet valve movements and adapted to engage the rod for the timed actuation of said control valves of the auxiliary mechanism.

2. A valve mechanism comprising a valve housing formed with a central chamber with an outlet at one end adapted for direct communication with the fuel intake passage of an engine cylinder, and formed with ports at opposite sides adapted to communicate, respectively, with a source of supply of fuel mixture, and with outside air, a valve rod reciprocably mounted in said housing and extended through said ports, shoulders on said rod spaced apart and facing away from each other, valve disks slidably mounted on the rod, springs acting against the valves to urge them toward closed positions over the ports and toward the shoulders; said shoulders being so spaced that when the rod is moved it permits one valve to close.

3. A valve mechanism as in claim 2 wherein the rod is spring actuated in one direction, and positively actuated in its other direction.

4. A combination as recited in claim 1 wherein the pivotal mounting of the rocker lever has an eccentric support, and means is provided for rotating the eccentric support thus to change the extent of rod movement as effected by the action of the inlet valve timing means.

References Cited in the file of this patent

UNITED STATES PATENTS

| | | |
|---|---|---|
| 1,186,952 | Shaw | June 13, 1916 |
| 1,316,730 | Loudon | Sept. 23, 1919 |

FOREIGN PATENTS

| | | |
|---|---|---|
| 298,128 | Great Britain | Sept. 5, 1929 |